US010657719B2

(12) United States Patent
Tezel et al.

(10) Patent No.: US 10,657,719 B2
(45) Date of Patent: May 19, 2020

(54) HOUSEHOLD APPLIANCE CONTROLLED BY USING A VIRTUAL INTERFACE

(71) Applicant: ARCELIK ANONIM SIRKETI, Istanbul (TR)

(72) Inventors: Yagiz Tezel, Istanbul (TR); Oner Hatipoglu, Istanbul (TR); Mehmet Sutcuoglu, Istanbul (TR); Ahmet Sozen, Istanbul (TR); Yusuf Kuyumcu, Istanbul (TR); Can Onur Vanci, Istanbul (TR); Ozgur Mutlu Oz, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 15/751,791

(22) PCT Filed: Aug. 3, 2016

(86) PCT No.: PCT/TR2016/050261
§ 371 (c)(1),
(2) Date: Feb. 9, 2018

(87) PCT Pub. No.: WO2017/026962
PCT Pub. Date: Feb. 16, 2017

(65) Prior Publication Data
US 2018/0357821 A1 Dec. 13, 2018

(30) Foreign Application Priority Data
Aug. 10, 2015 (TR) ................. a 2015 09839

(51) Int. Cl.
*G06T 19/00* (2011.01)
*F24C 15/20* (2006.01)
(Continued)

(52) U.S. Cl.
CPC ........ *G06T 19/006* (2013.01); *F24C 15/2021* (2013.01); *G03B 21/005* (2013.01); *G06F 3/011* (2013.01); *G06F 3/017* (2013.01)

(58) Field of Classification Search
CPC . G06T 19/006; F24C 15/2021; G03B 21/005; G06F 3/011; G06F 3/017
See application file for complete search history.

(56) References Cited

U.S. PATENT DOCUMENTS

2006/0278216 A1  12/2006  Gagas et al.
2012/0139689 A1   6/2012  Nakade et al.
(Continued)

FOREIGN PATENT DOCUMENTS

CH        700524 A1      8/2010
DE   102009026447 A1    12/2010
(Continued)

OTHER PUBLICATIONS

International search report and written opinion, dated Oct. 18, 2016, of International Application No. PCT/TR2016/050261; 8 pgs.

*Primary Examiner* — Chong Wu
(74) *Attorney, Agent, or Firm* — Kilpatrick Townsend & Stockton LLP

(57) ABSTRACT

The present invention relates to a household appliance comprising a projector which projects image of a virtual interface which enables control of household appliances within a projection area on a surface, a movement sensor which enables the gestures on the projection area to be detected, and a control unit which controls the projector and the household appliances to which the same is connected, by means of the data received from the movement sensor.

12 Claims, 3 Drawing Sheets

Figure 1:
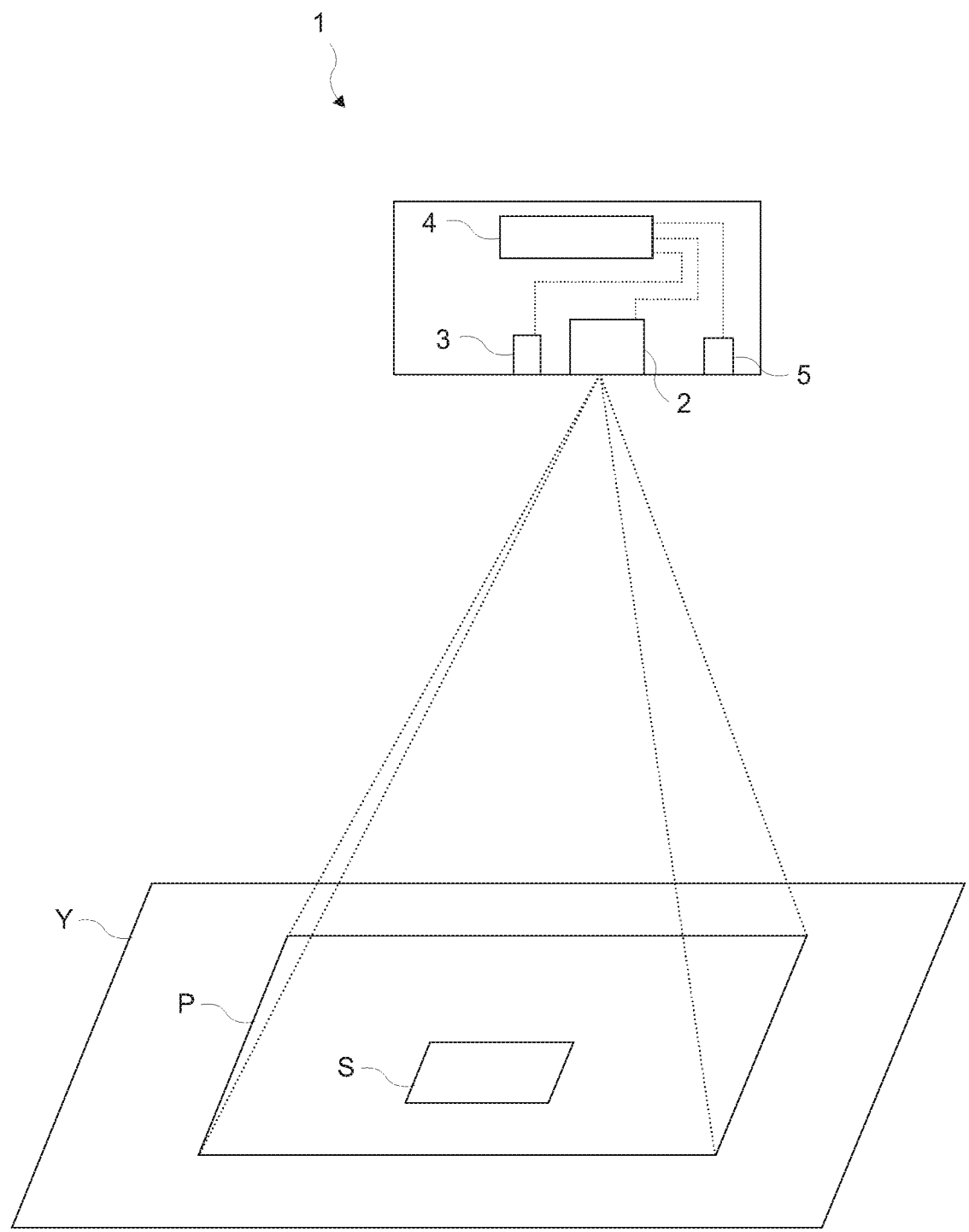

(51) Int. Cl.
    *G03B 21/00*    (2006.01)
    *G06F 3/01*    (2006.01)

(56) References Cited

U.S. PATENT DOCUMENTS

| | | | |
|---|---|---|---|
| 2012/0153157 A1* | 6/2012 | Estevadeordal | G01J 5/0088 |
| | | | 250/339.04 |
| 2013/0082971 A1 | 4/2013 | Brasseur et al. | |
| 2013/0100033 A1 | 4/2013 | Yuan et al. | |
| 2013/0154953 A1 | 6/2013 | Lai et al. | |
| 2013/0321361 A1* | 12/2013 | Lynch | G09G 3/3225 |
| | | | 345/204 |
| 2015/0165524 A1* | 6/2015 | Ljungblad | B22F 3/008 |
| | | | 419/53 |
| 2016/0295208 A1* | 10/2016 | Beall | G06T 7/80 |

FOREIGN PATENT DOCUMENTS

| | | |
|---|---|---|
| DE | 102010039371 A1 | 2/2012 |
| DE | 102010041549 A1 | 3/2012 |
| EP | 0554492 B1 | 8/1995 |
| WO | 2010135478 A2 | 11/2010 |
| WO | 2012080154 A1 | 6/2012 |
| WO | 2012150216 A1 | 11/2012 |
| WO | 2013096136 A1 | 6/2013 |
| WO | 2015078642 A1 | 6/2015 |
| WO | 2015078643 A1 | 6/2015 |

* cited by examiner

HOUSEHOLD APPLIANCE CONTROLLED BY USING A VIRTUAL INTERFACE

RELATED APPLICATIONS

This application is a U.S. National Phase of International Application No. PCT/TR2016/050261, filed Aug. 3, 2016, claiming priority to Turkish Patent Application No. 2015/09839, filed Aug. 10, 2015, contents of which are hereby incorporated by reference in their entirety.

The present invention relates to a household appliance having a control unit that enables the user to control any household appliances on the surface by projecting a virtual interface on the surface by means of a projector.

With the concept of Internet of Things, household appliances used at homes, particularly in kitchens, can be controlled from a single point of control. Systems enabling the control of household appliances by projecting a virtual interface on a surface, such as a kitchen counter, by means of a projector and sensing of hand/arm gestures of the user on the virtual interface are known in the state of the art. The user may place the hot pot taken from over the cooker into the area wherein the projector projects images. In such systems, the image of the virtual interface providing control being projected on the kitchen counter where the user performs all kitchen works and where hot objects may be present poses problems in terms of the safety of the user.

In the state of the art International Patent Application No. WO2010135478, control of household appliances by means of a virtual interface projected on a surface is disclosed.

In the state of the art International Patent Application No. WO2015078643, a control unit integrated into an exhaust hood and that communicates with a temperate sensor disposed on the cooker on the surface is disclosed.

In the state of the art German Patent Application No. DE102009026447, projection of the input for controlling of household appliances by means of a projector is disclosed.

The aim of the present invention is to realize a household appliance enhancing the user experience and satisfaction by using a virtual interface.

The household appliance realized in order to attain the aim of the present invention explicated in the first claim and the respective claims thereof comprises a temperature sensor that is disposed next to the projector projecting the virtual interface providing the control of the household appliances and that provides the measurement of the temperatures within the projection area whereto the projector projects images, and a control unit that monitors the data received from the temperature sensor and the temperature on the surface and that draws the temperature map on the surface to be used in different embodiments.

In the household appliance of the present invention, the control unit measures the temperature of the regions and the objects remaining within the projection area of the project on the surface by using the temperature sensor. The movement sensor detecting the hand/arm gestures of the user detects the movements in the projection area of the projector. Thus, the control unit detects the movements in the projection area of the projector and measures the temperatures. The control unit uses environment data such as the temperature of the projection area detected by using the temperature sensor in addition to the data received from the user by means of the movement sensor, thus improving the user experience and satisfaction.

In an embodiment of the present invention, the control unit controls the projector according to the data received from the temperature sensor. In other words, the control unit changes the image projected on the surface according to the temperature map drawn by means of the temperature sensor. The embodiment having sub-embodiments such as projecting the temperature data received from the temperature sensor on the surface, determining the position of the virtual interface according to the temperature data and warning the user by means of the projector according to the temperature data is explained in detail by means of the below embodiments.

In another embodiment of the present invention, the user can change the position of the virtual interface providing the control of the household appliances according to his/her preference and the control unit does not allow the virtual interface to be carried to the hot regions on the surface. Thus, the user is prevented from getting wounded while controlling the household appliances.

In another embodiment of the present invention, the control unit warns the user when an object at a temperature higher than a limit temperature predetermined by the producer or the user is placed on the surface so as to remain within the projection area. In a version of this embodiment, the user is warned by projecting a warning text around the region at a temperature higher than the limit temperature. In another version, the temperature information of the region at a temperature higher than the limit temperature is projected on the surface in Celsius or in another temperature unit selected by the user. In yet another version, the user is warned by illuminating the region at a temperature higher than the limit temperature in a color different from the rest of the surface.

In another embodiment of the present invention, when an object at a different temperature is placed on the surface, the control unit detects the temperature difference and projects on the surface the temperature of the object placed on the surface. The control unit constantly measures the temperature of the area whereon the image is projected by means of the temperature sensor and keeps the data in the memory thereof. When the user places an object at a temperature different than the actual temperature of the surface, the control unit automatically projects on the surface the temperature of the relevant object. For example, when the user absently places a hot pot on the projection area, the control unit projects the temperature of the pot on the surface, thus preventing the user from damaging the surface produced from laminate, etc.

In another embodiment of the present invention, when an object is placed on a predetermined region of the projection area on the surface, the control unit projects the temperature of the object around the object.

In another embodiment of the present invention, when the user wants to learn the temperature of a region or object on the surface, he/she performs a predefined command, for example a hand/arm gesture within the detection limits of the movement sensor and the control unit projects on the surface the temperature of the relevant surface/object.

In another embodiment of the present invention, the control unit communicates in a wireless manner with the household appliances that are enabled to be controlled by the user via the virtual interface. The control unit receives and sends data such as commands of the user and responds of the household appliances to these commands by means of the techniques used in the wireless communication.

In an embodiment of the present invention, the household appliance is an exhaust hood. In this embodiment, the control unit, the projector, the movement sensor and the temperature sensor are embedded into the body of the exhaust hood. The projector on the exhaust hood projects on the kitchen counter and the temperature sensor measures the temperatures of the objects on the kitchen counter.

In another embodiment of the present invention, a cooking appliance such as cooker is disposed under the household appliance which is an exhaust hood so as to remain within the projection area. The cooker is positioned on the surface so as to be in the projection area and the control unit enables the cooker to be turned off if the temperature on the area of the cooker in operation exceeds a limit cooker temperature. Thus, the user can monitor the temperature of the foodstuff being cooked on the cooker as per his/her preference and can terminate the cooking process at the desired temperature by using the virtual interface.

Moreover, by means of the temperature sensor, the user can immediately learn the temperature of an object taken out of the refrigerator or the oven only by placing the same on the surface.

By means of the household appliance of the present invention, the safety of the user using the virtual interface projected on a surface such as kitchen counter, etc. is provided and moreover, by measuring the temperatures of the objects on the surface, user satisfaction is improved. Furthermore, by means of the virtual interface, the user experience is improved by means of the temperature sensor and the above-disclosed embodiments wherein the temperature sensor is used.

The household appliance realized in order to attain the aim of the present invention is illustrated in the attached figures, where:

FIG. 1—is the schematic view of a household appliance.

Figure 2:
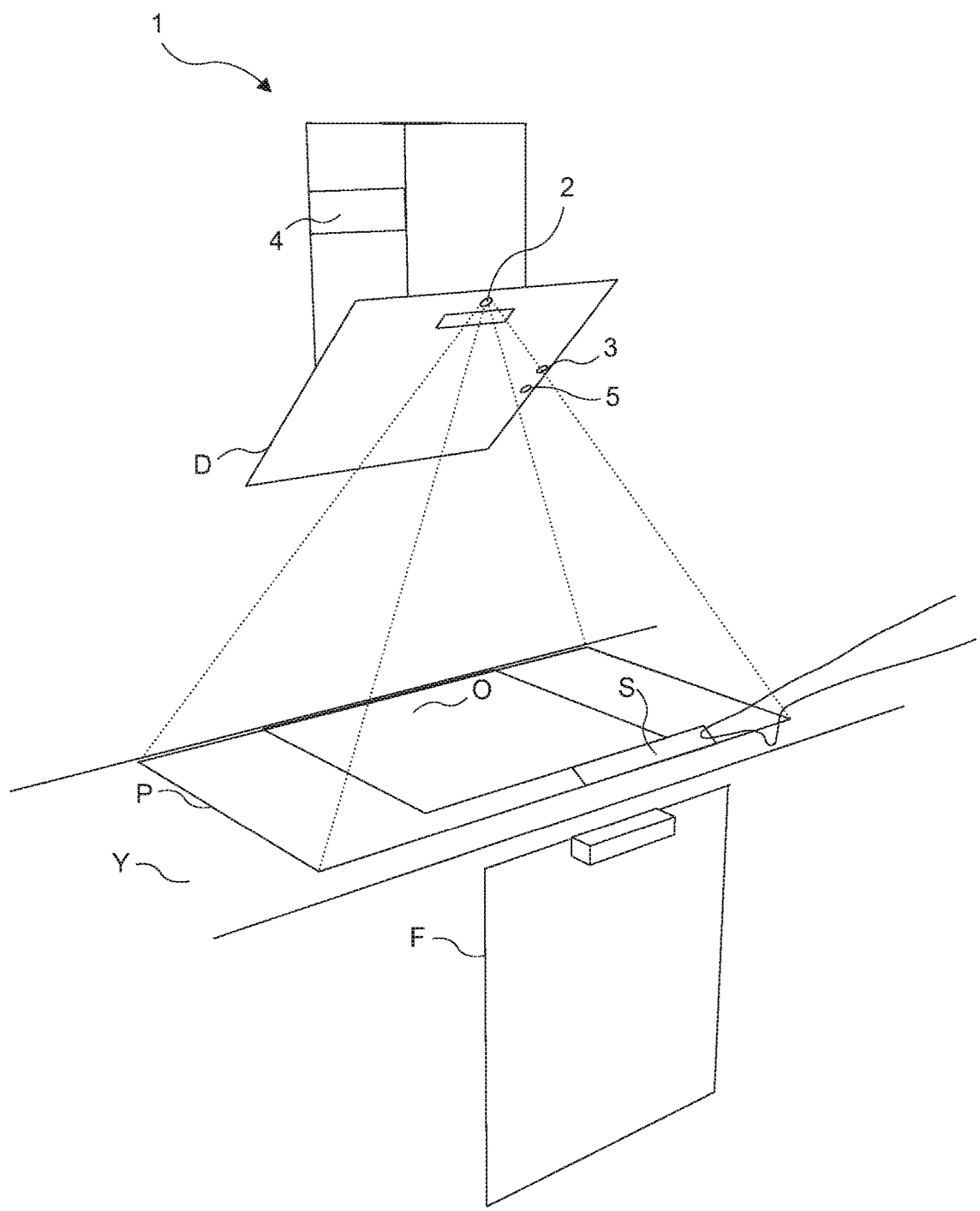

FIG. 2—is the schematic view of the household appliance related to an embodiment of the present invention.

Figure 3:
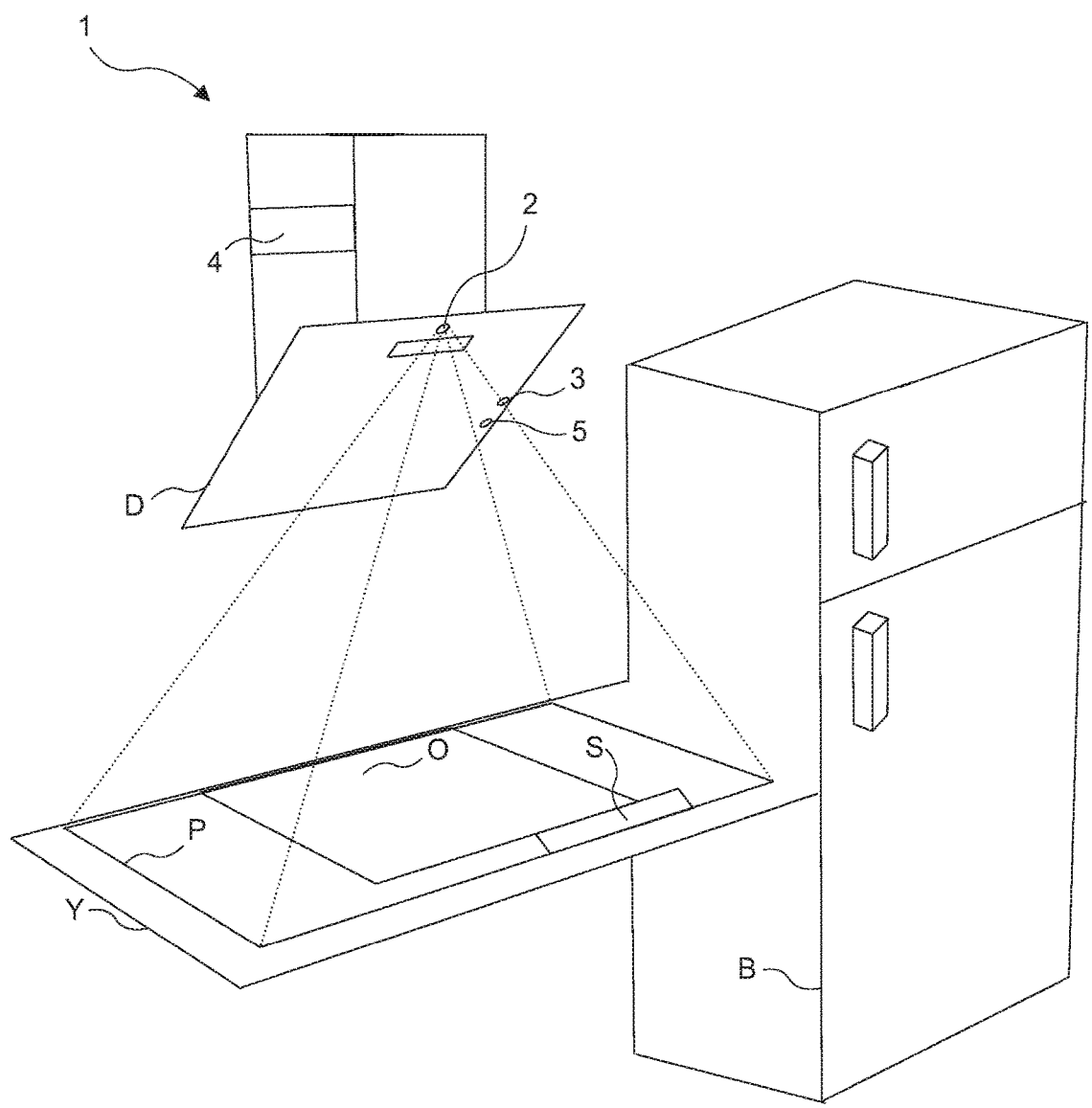

FIG. 3—is the schematic view of the household appliance related to another embodiment of the present invention.

The elements illustrated in the figures are numbered as follows:
1. Household appliance
2. Projector
3. Movement sensor
4. Control unit
5. Temperature sensor The following symbols are used for explicating the household appliance (1) of the present invention.
Y: Surface
P: Projection area
S: Virtual interface
O: Cooker
D: Exhaust hood
F: Oven
B: Refrigerator The household appliance (1) comprises a projector (2) which projects image of a virtual interface (S) which enables control of household appliances within a projection area (P) on a surface (Y), a movement sensor (3) which enables the gestures on the projection area (P) to be detected, and a control unit (4) which controls the projector (2) and the household appliances to which the same is connected, by means of the data received from the movement sensor (3).

The household appliance (1) projects by means of the projector (2) an image of the virtual interface (S) on the surface (Y) to enable the control of the household appliance (1) and other household appliances. The area on which the projector (2) projects is the projection area (P), and the virtual interface (S) remains within the projection area (P), and besides the image of the virtual interface (S), also other images are projected on the projection area (P) to provide information to the user. When the user reaches by hand any key of his/her choice on the virtual interface (S), the movement sensor (3) detects the hand of the user and transmits the data to the control unit (4). The control unit (4) matches the data received from the movement sensor (3) with the image projected on the surface (Y), thus detecting which function the user wants to execute. If the user wants to execute a function related with the household appliances, the control unit (4) enables the transmission of the relevant command to the control unit (not shown in the figures) of the respective household appliance. Similarly, when the user wants to change the menu image of the virtual interface (S) to a different image and to change the position of the virtual interface (S), the control unit (4) controls the projector (2) and enables the projection of the desired image.

The area on which the image is projected from the projector (2) on at least a part of the surface (Y) forms the projection area (P). The projector (2) projects a still image on the projection area (P) and the virtual interface (S) that enables the control of the household appliances covers a part of the projection area (P). The user can move the virtual interface (S) to any sector of their choice so as to remain within the projection area (P). The movement sensor (3) detects the gestures that is performed on the projection area (P). Hence, the detection area of the movement sensor (3) is the same with the projection area (P) on which the projector (2) projects the image. The movement sensor (3) can execute the detection process by using the elevation difference, as well as by using the other methods known in the state of the art. The movement sensor (3) detects the movements within the projection area (P) and transmits them, together with the position data, to the control unit (4).

The control unit (4) matches the position data with the image projected by the projector (2) and detects the action that the user wants to execute. The control unit (4) also enables the control of the household appliance (1) and any other household appliances whereto the control unit (4) is connected. The user selects by using the virtual interface (S) the household appliance (1) he/she wants to use and then executes whatever functions he/she wants by means of the virtual interface (S) of the household appliance (1).

The household appliance (1) of the present invention comprises a temperature sensor (5) that measures the temperature of the surfaces or the objects on the projection area (P) and the control unit (4) that monitors the temperature of and/or that draws the temperature map of the projection area (P) by means of the data received from the temperature sensor (5). By means of the temperature sensor (5) disposed next to the projector (2) with the movement sensor (3), the temperatures in the projection area (P) are monitored by the control unit (4) and the control unit (4) detects the temperatures of the surfaces in the projection area (P) or of the objects in the projection area (P). The control unit (4) draws the temperature map within the projection area (P) and keeps the same in the memory thereof to be used in different embodiments.

The temperature sensor (5) can be a thermal detector, or an infrared detector, a thermopile detector used for temperature measurement or any other detector in the technique disposed so as to face the projection area (P). The area where the temperature sensor (5) makes temperature measurement can be different from the projection area (P) according to the type of the temperature sensor (5), however the said area is at least large enough to include the projection area (P) whereto the projector (2) projects.

In an embodiment of the present invention, the control unit (4) controls the image projected on the projection area (P) according to the temperature information of the projection area (P), in other words controls the projector (2) according to the data received from the temperature sensor (5). The control unit (4) determines the image projected by the projector (2) according to the temperature information of the projection area (P). For example, as per the user preference, the control unit (4) changes the image projected on the projection area (P) by the projector (2) and projects the temperature map of the projection area (P).

In another embodiment of the present invention, if the temperature of a region on the projection area (P) is higher than a predetermined limit temperature, the control unit (4) prevents the virtual interface (S) from being carried to the said region. In this embodiment, the control unit (4) draws the temperature map of the projection area (P) by means of the temperature sensor (5) and determines the positions wherein the virtual interface (S) providing the control of the household appliances can be moved according to the said temperature map. For example, when the user wants the virtual interface (S) to a region wherein a pot was present a short time ago, the control unit (4) prevents this action so as to prevent the user from burning his/her hand.

In another embodiment of the present invention, if the temperature of a region on the projection area (P) is higher than a predetermined limit temperature, the control unit (4) enables the user to be warned. In this embodiment, the limit temperature is predetermined by the producer and can be changed later by the user. For example, the user adjusts the temperature whereat the surface (Y) can be damaged as the limit temperature and when an object at a temperature higher than the limit temperature is placed into the projection area (P), the control unit (4) enables the user to be warned. The user is warned by audio and/or video means.

In a version of this embodiment, the control unit (4) enables a warning text to be projected to the region at a temperature higher than the limit temperature to warn the user. For example, expressions such as "hot", "very hot" or "warning: hot surface" are used according to the temperature value. By means of this embodiment, the users are prevented from being touching a hot region in the projection area (P) and from being wounded.

In another version of this embodiment, the control unit (4) enables the temperature information of the region at a temperature higher than the limit temperature to be projected in Celsius or in any other temperature unit selected by the user to warn the user.

In another version of this embodiment, the control unit (4) enables the region in the projection area (P) at a temperature higher than the limit temperature to be illuminated in a color different than the rest of the projection area (P) to warn the user. For example, by projecting the color red on the hot regions by means of the projector (2), the user will know the hot regions on the surface (Y) without touching.

In another embodiment of the present invention, if an object at a temperature different than the average temperature of the projection area (P) is placed on the projection area (P), the control unit (4) projects the temperature of the object to the projection area (P). The control unit (4) monitors the temperature information of the projection area (P) at certain intervals by means of the temperature sensor (5) and thus, information such as temperature information of the surfaces/objects in the projection area (P), the average temperature of the projection area (P), etc. are constantly present in the memory of the control unit (4). When an object at a different temperature is placed on the projection area (P), the control unit (4) projects the temperature of the object to the projection area (P) without any intervention of the user.

In another embodiment of the present invention, if an object is placed on a predetermined region on the projection area (P), the control unit (4) projects the temperature of the object to the projection area (P). In this embodiment, when the user, who wants to learn the temperature of an object, for example a beverage bottle, places the said object onto a predefined region in the projection area (P), the control unit (4) detects the change in the predefined region by means of the movement sensor (3) and measures the temperature of the said region by means of the temperature sensor (5) and projects the temperature information on the projection area (P) by means of the projector (2). The said region can be predefined by the producer or can be determined by the user.

In another embodiment of the present invention, the control unit (4) projects the temperature of a region or an object in the projection area (P) onto the projection area (P) after the user performs a predetermined command. The said command can be predefined by the producer or can be defined by the user. The predefined command can be the user performing a hand/arm gesture in the projection area (P) or pointing the surface/object of which the temperature he/she desires to learn. In this embodiment, the movement sensor (3) detects the command of the user and delivers the same to the control unit (4) and the control unit (4) enables the temperature of the surface/object in the relevant region to be measured by using the temperature sensor (5) and enables the measured temperature to be projected on the projection area (P) by means of the projector (2).

In another embodiment of the present invention, the control unit (4) communicates in a wireless manner with the household appliances that the user uses by means of the virtual interface (S). In this embodiment, the control unit (4) exchanges data with the other household appliances by means of an antenna (not shown in the figures) by using Bluetooth or Wi-Fi radio frequencies. The wireless communication methods are not limited to the methods given above as example and there can be different wireless communication methods depending on the usage needs.

In another embodiment of the present invention, the household appliance (1) is an exhaust hood (D) into which the projector (2), the movement sensor (3), the control unit (4) and the temperature sensor (3) are integrated. Since the exhaust hood (D) is positioned by its function above the kitchen counter, the projector (2) projects its beam on a convenient surface (Y) on the counter or on a surface (Y) chosen by the user. In this embodiment, besides the exhaust hood (D), cooking appliances such as cooker (O), oven (F), etc. and cooling appliances such as refrigerator (B), etc. can be controlled.

In a version of this embodiment, a cooker (O) is disposed under the exhaust hood (D) so as to remain within the projection area (P) and the control unit (4) enables the cooker (O) to be turned off if the temperature on the cooker (O) in operation exceeds a limit cooker temperature predetermined by the producer or the user. In this embodiment, the exhaust hood (D) is positioned preferably so as to be above a cooker (O) and the projector (2) casts projection so that the cooker (O) is in the projection area (P). The temperature sensor (5) measures the temperatures of the surfaces of the projection area (P) including the cooker (O) and the temperatures of the objects on the projection area (P). The control unit (4) is in cable or wireless communication with the cooker (O) and enables the cooker (O) to be controlled by means of the virtual interface (S). Moreover, the control unit (4) measures the temperatures on the cooker (O) by means of the temperature sensor (5). The control unit (4) enables the cooker (O) to be turned off if the temperature on the cooker (O) in operation exceeds a limit cooker temperature predetermined by the producer or the user. Thus, for example, the foodstuff being cooked on the cooker (O) is prevented from burning.

In another embodiment of the present invention, the household appliance (1) is used for controlling of an oven (F). The household appliance (1) communicates in a wireless manner with the oven (F). The control unit (4) projects by means of the projector (2) a virtual interface (S) related to the functions of the oven (F) on the projection area (P) so as to control the oven (F) and enables the user to control the oven (F). For example, the user projects the image of the food being cooked in the oven (F) and can check the status of the food being cooked without opening the door of the oven (F). Moreover, the temperature of a foodstuff taken out of the oven (F) can be learned by means of the temperature sensor (5).

In another embodiment of the present invention, the household appliance (1) is used for controlling of a refrigerator (B). The household appliance (1) communicates in a wireless manner with the refrigerator (F). The control unit (4) projects by means of the projector (2) a virtual interface (S) related to the functions of the refrigerator (B) on the projection surface (P) so as to control the refrigerator (B) and enables the user to control the refrigerator (B). The user can check the air flow and the temperature in the refrigerator (B) without opening the door of the refrigerator (B). Moreover, the control unit (4) communicates with a camera in the refrigerator (B) and projects the image taken by the camera onto the projection area (P) by means of the projector (2). Thus, the user can learn which foodstuff is present in the compartments of the refrigerator (B) in what amount and if there are ice cubes in the ice tray of the freezing compartment without opening the door of the refrigerator (B). By means of the temperature sensor (5) of the present invention, the temperatures of the objects taken out of the refrigerator (B) can be learned by placing the objects onto the projection area (P).

The household appliances that can be controlled by means of the control unit (4) of the household appliance (1) of the present invention are not limited to the household appliances mentioned above and the household appliance (1) can also control household appliances such as washing machine, dish washer, dryer, etc. In addition, small household appliances such as coffee maker, fruit press, food processor, etc. can be controlled by means of the household appliance (1).

By means of the household appliance (1), the user can control the household appliance he/she uses at his/her house even from another room and by placing an object of which the temperature he/she wants to learn into the projection area (P), can learn the temperature of the object by means of the temperature sensor (5). Moreover, by means of the present invention, the user interacting with the image of the virtual interface (S) projected on the surface (Y) is prevented from being wounded due to the hot objects on the surface (Y) or hot objects that have transferred their heat onto the surface (Y) or that have been moved.

The invention claimed is:

1. A household appliance comprising:
   a projector configured to project an image of a virtual interface which enables control of household appliances within a projection area on a surface,
   a movement sensor configured to detect gestures on the projection area,
   a temperature sensor configured to measure a temperature of surfaces or objects on the projection area,
   a control unit that wirelessly communicates with the household appliances to receive and send data, that includes a memory for storing data, and that is configured to:
      control the projector and the household appliances to which the projector is connected, based on data received from the movement sensor,
      monitor the temperature of the projection area, and draw a temperature map of the projection area based on data received from the temperature sensor, and
      control content of the image projected on the projection area according to the temperature of the projection area.

2. The household appliance as in claim 1 wherein the control unit is further configured to prevent the virtual interface from being carried to a region on the projection area when a temperature of the region is higher than a predetermined limit temperature.

3. The household appliance as in claim 1, wherein the control unit is further configured to warn a user when a temperature of a region on the projection area is higher than a predetermined limit temperature.

4. The household appliance as in claim 3, wherein the control unit is further configured to control the projector to project a warning text onto the region on the projection area at the temperature higher than the predetermined limit temperature.

5. The household appliance as in claim 3, wherein the control unit is further configured to control the projector to project the temperature in writing onto the region on the projection area at the temperature higher than the predetermined limit temperature.

6. The household appliance as in claim 3, wherein the control unit is further configured to control the projector to present the region on the projection area at the temperature higher than the predetermined limit temperature in a color different than other regions of the projection area.

7. The household appliance as in claim 1 wherein the control unit is configured to control the projector to project, on the projection area, a temperature of an object placed on the projection area when the temperature of the object is different than an average temperature of the projection area.

8. The household appliance as in claim 1 wherein the control unit is further configured to control the projector to project, on the projection area, a temperature of an object placed on a predetermined region on the projection area.

9. The household appliance as in claim 1 wherein the control unit is further configured to control the projector to project, on the projection area, a temperature of a region or an object in the projection area based on a user performing a predetermined command.

10. The household appliance as in claim 1, wherein the control unit is configured to communicate wirelessly with the household appliances controlled by the virtual interface.

11. A household appliance which is an exhaust hood into which the projector, the movement sensor, the control unit and the temperature sensor as in claim 1 are integrated.

12. The household appliance as in claim 11, further comprising:
   a cooker disposed under the exhaust hood within the projection area,
   wherein the control unit is further configured to turn off the cooker when a temperature of the cooker in operation exceeds a limit cooker temperature.

* * * * *